(12) United States Patent
Greyzck

(10) Patent No.: US 8,458,685 B2
(45) Date of Patent: Jun. 4, 2013

(54) VECTOR ATOMIC MEMORY OPERATION VECTOR UPDATE SYSTEM AND METHOD

(75) Inventor: Terry D. Greyzck, Eagan, MN (US)

(73) Assignee: Cray Inc., Seattle, WA (US)

( * ) Notice: Subject to any disclaimer, the term of this patent is extended or adjusted under 35 U.S.C. 154(b) by 955 days.

(21) Appl. No.: 12/483,672

(22) Filed: Jun. 12, 2009

(65) Prior Publication Data

US 2010/0318979 A1    Dec. 16, 2010

(51) Int. Cl.
*G06F 9/45* (2006.01)

(52) U.S. Cl.
USPC ................................................ 717/160

(58) Field of Classification Search
USPC ................................................ 717/160
See application file for complete search history.

(56) References Cited

U.S. PATENT DOCUMENTS

| | | | |
|---|---|---|---|
| 4,047,158 A | 9/1977 | Jennings | |
| 4,128,880 A | 12/1978 | Cray | |
| 4,710,872 A | 12/1987 | Scarborough | |
| 4,817,187 A | 3/1989 | Lien | |
| 4,821,181 A | 4/1989 | Iwasawa et al. | |
| 4,833,606 A | 5/1989 | Iwasawa et al. | |
| 4,858,115 A | 8/1989 | Rusterholz et al. | |
| 4,967,350 A | 10/1990 | Maeda et al. | |
| 5,036,454 A | 7/1991 | Rau et al. | |
| 5,083,267 A | 1/1992 | Rau et al. | |
| 5,151,991 A | 9/1992 | Iwasawa et al. | |
| 5,247,696 A | 9/1993 | Booth | |
| 5,408,677 A | 4/1995 | Nogi | |
| 6,560,282 B2 | 5/2003 | Tahara et al. | |
| 7,360,142 B1 | 4/2008 | Barash | |
| 7,409,505 B2 | 8/2008 | Scott et al. | |
| 7,590,589 B2 | 9/2009 | Hoffberg | |
| 7,656,706 B2 | 2/2010 | Jiang et al. | |
| 7,660,967 B2 | 2/2010 | Hutson | |
| 2004/0006667 A1* | 1/2004 | Bik et al. ................... 711/100 |
| 2005/0240644 A1 | 10/2005 | Van Berkel et al. | |
| 2009/0138680 A1 | 5/2009 | Johnson et al. | |

FOREIGN PATENT DOCUMENTS

JP        63-120338        5/1988

OTHER PUBLICATIONS

Fang et al., "Active Memory Operations", The 21st International Conference on Supercomputing, Jun. 18-20, 2007, 10 pages.

Kumar et al., "Atomic Vector Operations on Chip Multiprocessors", Proceedings of the 35th Annual International Symposium on Computer Architecture, Jun. 21-25, 2008, IEEE Computer Society Washington, DC, USA 2008, pp. 441-452.

* cited by examiner

*Primary Examiner* — John Chavis
(74) *Attorney, Agent, or Firm* — Perkins Coie LLP

(57) ABSTRACT

A system and method of compiling program code, wherein the program code includes an operation on an array of data elements stored in memory of a computer system. The program code is scanned for an equation which may have recurring data points. The equation is then replaced with vectorized machine executable code, wherein the machine executable code comprises a nested loop and wherein the nested loop comprises an exterior loop and a virtual interior loop. The exterior loop decomposes the equation into a plurality of loops of length N, wherein N is an integer greater than one. The virtual interior loop executes vector operations corresponding to the N length loop to form a result vector resident in memory, wherein the virtual interior loop includes a vector atomic memory operation (AMO) instruction.

9 Claims, 3 Drawing Sheets

US 8,458,685 B2

VECTOR ATOMIC MEMORY OPERATION VECTOR UPDATE SYSTEM AND METHOD

FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. MDA904-02-3-0052, awarded by the Maryland Procurement Office.

RELATED APPLICATION

This application is related to U.S. patent application Ser. No. 11/946,490, filed Nov. 28, 2007, entitled "Vector Atomic Memory Operations," which is incorporated herein by reference.

FIELD OF THE INVENTION

The invention relates generally to vector computer software, and more specifically to a vector atomic memory operation system and method for handling recurring points in vector updates.

BACKGROUND

Supercomputers are high performance computing platforms that employ a pipelined vector processing approach to solving numerical problems. Vectors are ordered sets of data. Problems that can be structured as a sequence of operations on vectors can experience one to two orders of magnitude increased throughput when executed on a vector machine (compared to execution on a scalar machine of the same cost). Pipelining further increases throughput by hiding memory latency through the prefetching of instructions and data.

A pipelined vector machine is disclosed in U.S. Pat. No. 4,128,880, issued Dec. 5, 1978, to Cray, the disclosure of which is hereby incorporated herein by reference. In the Cray machine, vectors are usually processed by loading them into operand vector registers, streaming them through a data processing pipeline having a functional unit, and receiving the output in a result vector register.

For vectorizable problems, vector processing is faster and more efficient than scalar processing. Overhead associated with maintenance of the loop-control variable (for example, incrementing and checking the count) is reduced. In addition, central memory conflicts are reduced (fewer but bigger requests) and data processing units are used more efficiently (through data streaming).

Vector processing supercomputers are used for a variety of large-scale numerical problems. Applications typically are highly structured computations that model physical processes. They exhibit a heavy dependence on floating-point arithmetic due to the potentially large dynamic range of values within these computations. Problems requiring modeling of heat or fluid flow, or of the behavior of a plasma, are examples of such applications.

Program code for execution on vector processing supercomputers must be vectorized to exploit the performance advantages of vector processing. Vectorization typically transforms an iterative loop into a nested loop with an inner loop of VL iterations, where VL is the length of the vector registers of the system. This process is known as "strip mining" the loop. In strip mining, the number of iterations in the internal loop is either fixed, or defined by the length of a vector register, depending on the hardware implementation; the number of iterations of the external loop is defined as an integer number of vector lengths. Any remaining iterations are performed as a separate loop placed before or after the nested loop, or alternately as constrained-length vector operations within the body of the vector loop.

Compilers exist that will automatically apply strip mining techniques to scalar loops within program code to create vectorized loops. This capability greatly simplifies programming efficient vector processing.

There are, however, certain types of problems that resist vectorization. Equations of the form $X(j(i))=f\{X(j(i)), Y(i)\}$ are difficult to vectorize due to the possibility that the same data point in X may be needed for different Y(i) within a single vector operation.

It is clear that there is a need for improved methods of vectorizing scalar loops. In addition, there is a need for a method of vectorizing scalar loops containing equations with potential recurring data points such that the method can be placed into a compiler in order to automatically vectorize such loops.

DETAILED DESCRIPTION

The present invention provides a vector update method for vectorizing loops containing recursive equations within a supercomputer. One vector update method for vectorizing loops containing recursive equations within a supercomputer is described in U.S. Pat. No. 5,247,696, issued Sep. 21, 1993 to Michael W. Booth, the description of which is incorporated herein by reference.

In the vector update method described by Booth, program code containing a loop is transformed into a nested loop in which the interior loop performs an integer number of iterations of the original loop equal to the vector length of the system. Vector operations are executed on the arrays of data within the interior loop, a check is made for recurring data points and repairs are made to the results of the vector operations. All repairs are completed before exiting the interior loop.

The vector update method requires no additional memory for the vectorization of program code. Furthermore, it is designed to vectorize loops without recursive elements with negligible loss in performance.

Figure 1:
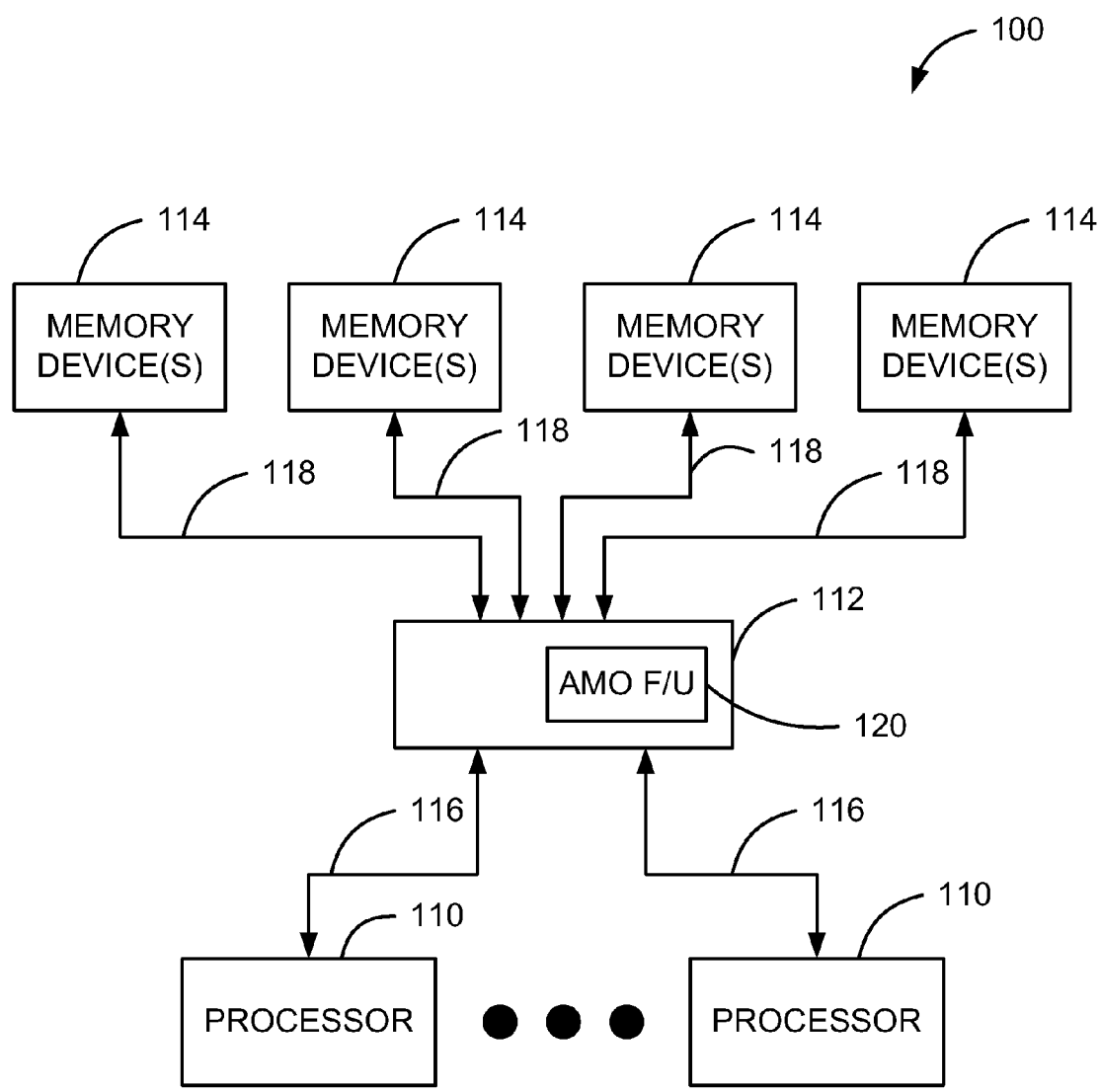
FIG. 1 shows a functional block diagram of a computer system with vector atomic memory capability.

FIG. 1 illustrates a functional block diagram of a computer system 100, including one or more processors 110 connected through a memory controller 112 to one or more memory devices 114.

Processor 110 is not limited to any particular type of processor. In various embodiments, processor 110 is not a single processor, and may include any number of processors operating in a multi-processor system. In various embodiments, processor 110 includes cache memory.

In one embodiment, system 100 is a node in a larger system. In one such embodiment, each node includes four processors 110 and sixteen memory controllers 112. Channels 116 between processors 110 and controllers 112 use a 4-bit wide 5.0 Gbaud serializer/deserializer (SerDes) for an aggregate channel bandwidth of 16×2.5 Gbytes/s=40 Gbytes/s per direction—160 Gbytes/s per direction for each node.

In one such embodiment, controllers 112 serve as pin expanders, converting a small number of high-speed differential signals received from the processors 110 on channels 116 into a large number of single-ended signals that interface to commodity DDR2 memory parts on memory channels 118. Each memory controller 112 manages four DDR2 memory channels, each with a 40-bit-wide data/ECC path. The 32-bit data path, coupled with the four-deep memory access bursts of DDR2, provides a minimum transfer granularity of only 16 bytes. Thus the controller 112 with its associated memory devices have twice the peak data bandwidth and four times the single-word bandwidth of a standard 72-bit-wide DIMM.

In one embodiment, each memory channel 118 is connected to up to ten DDR2 DRAM.

In one embodiment, two or more processors 110 are located on a single compute node printed circuit board. In one such embodiment, the memory controller 112 and its associated memory devices 114 are located on a memory daughter card (MDC) that plugs into a connector on the compute node printed circuit board. Each of the eight MDCs contains 20 or 40 memory parts, providing up to 128 Gbytes of memory capacity per node using 1-Gbit memory parts.

Returning to FIG. 1, memory devices 114 are not limited to any particular type of memory device. In various embodiments, memory devices 114 includes DRAM memory. In various embodiments, one or more memory devices 114 are double-data-rate two synchronous dynamic random access (DDR2 SDRAM) memory devices.

Memory device 114 is not limited to any particular configuration. In various embodiments, memory chips within memory device 114 are organized as five 8-bit devices, for a total of 40 bits. In some embodiments, only 39 of the 40 bits are used, where 32 bits are used for data and 7 bits are used to store an error correction code associated with the data bits. In various embodiments, the remaining bit is used to dynamically map out bad bits within the device, including the spare bit in a spare-bit insertion to repair persistent memory errors within the memory location providing the spare bit and having a persistent bit error.

Some processor operations are considered atomic, in that their occurrence can be considered a single event to the rest of the processor. More specifically, an atomic operation does not halfway complete, but either completes successfully or does not complete. This is important in a processor to ensure the validity of data, such as where multiple threads or operations can be operating on the same data type at the same time. For example, if two separate processes intent to read the same memory location, increment the value, and write the updated value back to memory, both processes may read the memory value before it is written back to memory. When the processes write the data, the second process to write the data will be writing a value that is out of date, as it does not reflect the result of the previously completed read and increment operation.

This problem can be managed using various mechanisms to make such operations atomic, such that the operation locks the data until the operation is complete or otherwise operates as an atomic operation and does not appear to the rest of the processor to comprise separate read and increment steps. This ensures that the data is not modified or used for other instructions while the atomic instruction completes, preserving the validity of the instruction result.

System 100 includes a new type of instruction for a computer processor, in which atomic operations on memory can be vectorized, operating on multiple memory locations at the same time or via the same instruction. This addition to the instruction set makes more efficient use of the memory and network bandwidth in a multiprocessor system, and enables vectorization of more program loops in many program applications. In one embodiment, as is shown in FIG. 1, each memory controller 112 includes an atomic memory operation functional unit 120 capable of performing vector atomic memory operation (AMO) instructions.

Examples of atomic memory operations included in one embodiment of AMO functional unit 120 include a vector atomic add, vector atomic AND, vector atomic OR, vector atomic XOR, vector atomic fetch and add, vector atomic fetch and AND, vector atomic fetch and OR, and a vector atomic fetch and XOR. The non-fetch versions of these instructions read the memory location, perform the specified operation, between the instruction data and the memory location data, and store the result to the memory location. The fetch versions perform similar functions, but also return the result of the operation to the processor rather than simply storing the result to memory.

There are two vector types in various embodiments, including strided and indexed vectors. Strided vectors use a base and a stride to create a vector length of the stride length starting at the base address. Indexed vector access uses a base and a vector of indexes to create a vector of memory addresses, enabling specification of a vector comprising elements that are not in order or evenly spaced.

In one embodiment, hardware implementation of the vector atomic memory operations includes use of additional decode logic to decode the new type of vector atomic memory instruction. Vector registers in the processor and a vector mask are used to generate the vector instruction, and a single atomic memory instruction in the processor issues a number of atomic memory operations. In the memory system, vector atomic memory operations operate much like scalar atomic memory operations, and the memory manager block provides the atomic memory operation support needed to execute these instructions.

In one embodiment, system 100 includes vector Atomic Memory Operation (vector AMO or VAMO) instructions. One such instruction is:

[Aj,Vk] AADD([Aj,Vk],Vi)

This represents an integer addition operation that operates on a series of memory locations defined by adding a base scalar register (Aj) to a vector of offsets (Vk). The memory locations defined by the resulting vector of addresses is incremented by the corresponding amount in vector (Vi), on an element-by-element basis. The memory system guarantees that if multiple elements of the vector of addresses defined by (Aj+Vk) are identical, the multiple instances are not performed simultaneously. This guarantees the same result as if the operation was performed with an equivalent series of scalar operations, as would happen on a non-vector architecture.

In one embodiment, other operations are provided for integer bitwise operations such as bitwise and, bitwise or, and bitwise exclusive or. The invention is not limited by any particular architecture, and is easily extended to support any commutative operation such as floating point and complex addition or multiplication, integer multiplication, or other bit manipulation primitives. One such vector AMO instruction set is described in U.S. Patent Application No. U.S. patent application Ser. No. 11/946,490, filed Nov. 28, 2007 entitled "Vector Atomic Memory Operations", the description of which is incorporated herein by reference.

The vector AMO instruction set can be used to implement a vector update method. A check is made to determine if the calculation to be performed falls within the class of problems with a potential for updates of the same elements with repeated indices (which are, as noted above, resistant to vectorization). If the loop fits within this class of loops, the code is vectorized by using a vector atomic memory operation directly, instead of much more complicated solutions described by earlier vector update patents.

These patterns can be abstracted to the form $X(IX(i))=f\{X(IX(i)), expression\}$, where X is an array in memory, IX is an integer array in memory, i is the loop index, and expression is any arithmetic expression. Function $f$ corresponds to the set of operations directly or indirectly supported by the vector AMO instruction set. Such an expression can be considered a vector update idiom.

An extension of the vector update idiom, recognized by the compiler, such that the for $X(vector\_expression)=f\{X(vector\_expression), expression)$. This is a generalization, as the vector_expression is not limited to the specific form IX(i) but can be any integer vector expression.

If the compiler cannot guarantee that array IX or vector expression contains no repeated values within a single vector, vector update mechanisms must be used to guarantee functionally correct results when vectorized.

A specific example of a loop that fits the pattern of a vector update that can be mapped to a vector atomic memory operation is, using the C language:

```
long *a, long *ix;
    for ( i = 0; i < n; i++ ) {
    a[ix[i]] = a[ix[i]]++;
    }
```

For this example, X is array 'a', IX is array 'ix', i is 'i', $f$ is +, and expression is 1.

In this example there may be repeated values within the ix[ ] array, so when the loop is parallelized through vectorization, the same location within array a[ ] may be updated multiple times. This generally makes the construct non-vectorizable unless the potential for repeated index values is accounted for. Previous vector update mechanisms typically depend on the memory hardware to perform ordered vector memory operations, and have complicated clean-up stages to account for where the index values collide. With the vector atomic memory mechanism, the compiler generates the appropriate instruction and the hardware-based memory controller resolves index collisions.

The compiler looks for a pattern of code that matches a vector update idiom as described above, determines that it cannot preclude the vector portion of the address computation having repeated values, and translates the idiom into an vector atomic memory operation.

Figure 2:
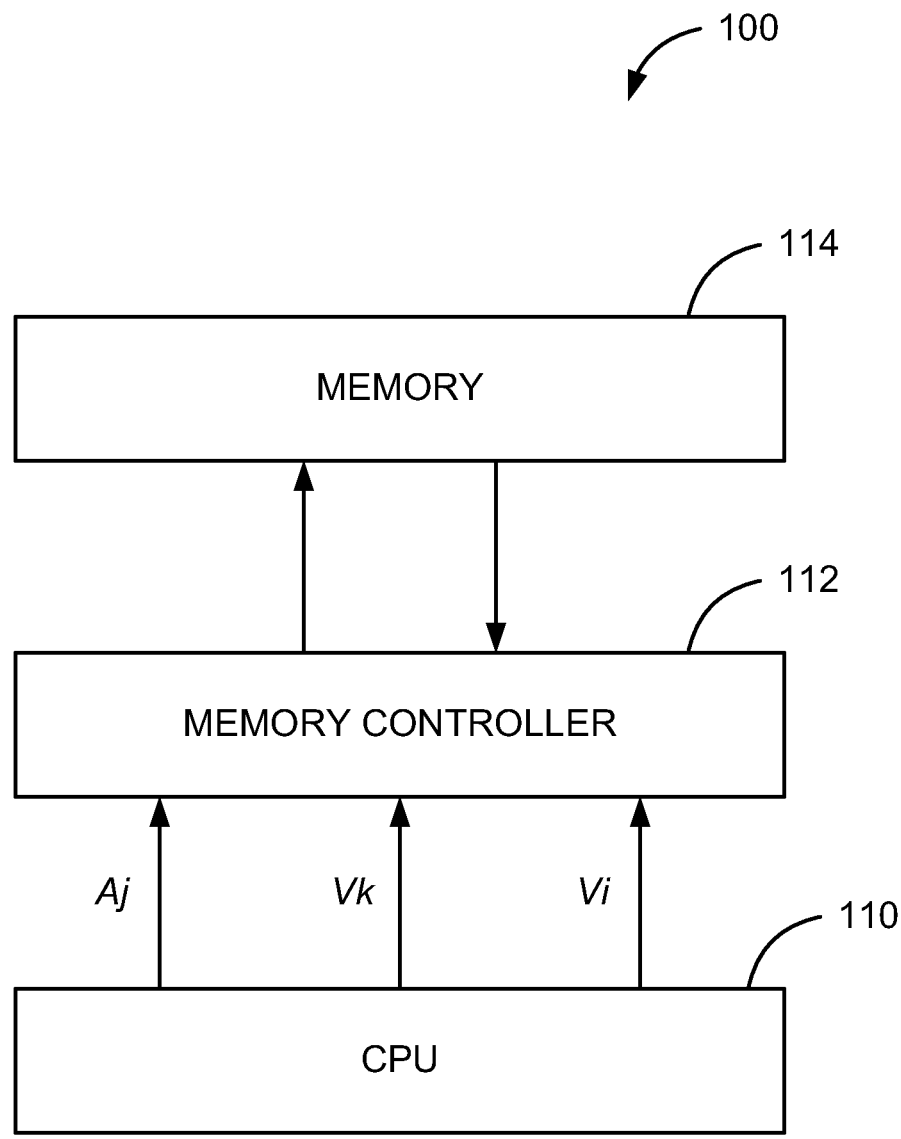
FIG. 2 shows update processing using a vector atomic memory operation.

FIG. 2 illustrates update processing using a vector atomic memory operation. As can be seen in FIG. 2, Aj is the address of x, the vector Vk is a vector of ix values, while the vector Vi is a vector of y values. [Aj, Vk, W]. The vector atomic memory operation [Aj,Vk] AADD([Aj,Vk],Vi) can then express:

$x[ix[i]]=x[ix[i]]+y[i];$ where Aj=address of x, Vk=vector of ix values and Vi=vector of y values.

The vector ix can contain repeated values, and memory controller 112 will detect and process them correctly.

In one embodiment, the Vector AMO may execute out order. In such embodiments, the method should only be used in situations where the operations to the same memory location can occur out of order.

An advantage of the Vector AMO vector update method is that it uses hardware instead of memory to resolve conflicts. In addition, it can be used to parallelize across vectors as well as across processors in multiprocessor systems.

Figure 3:
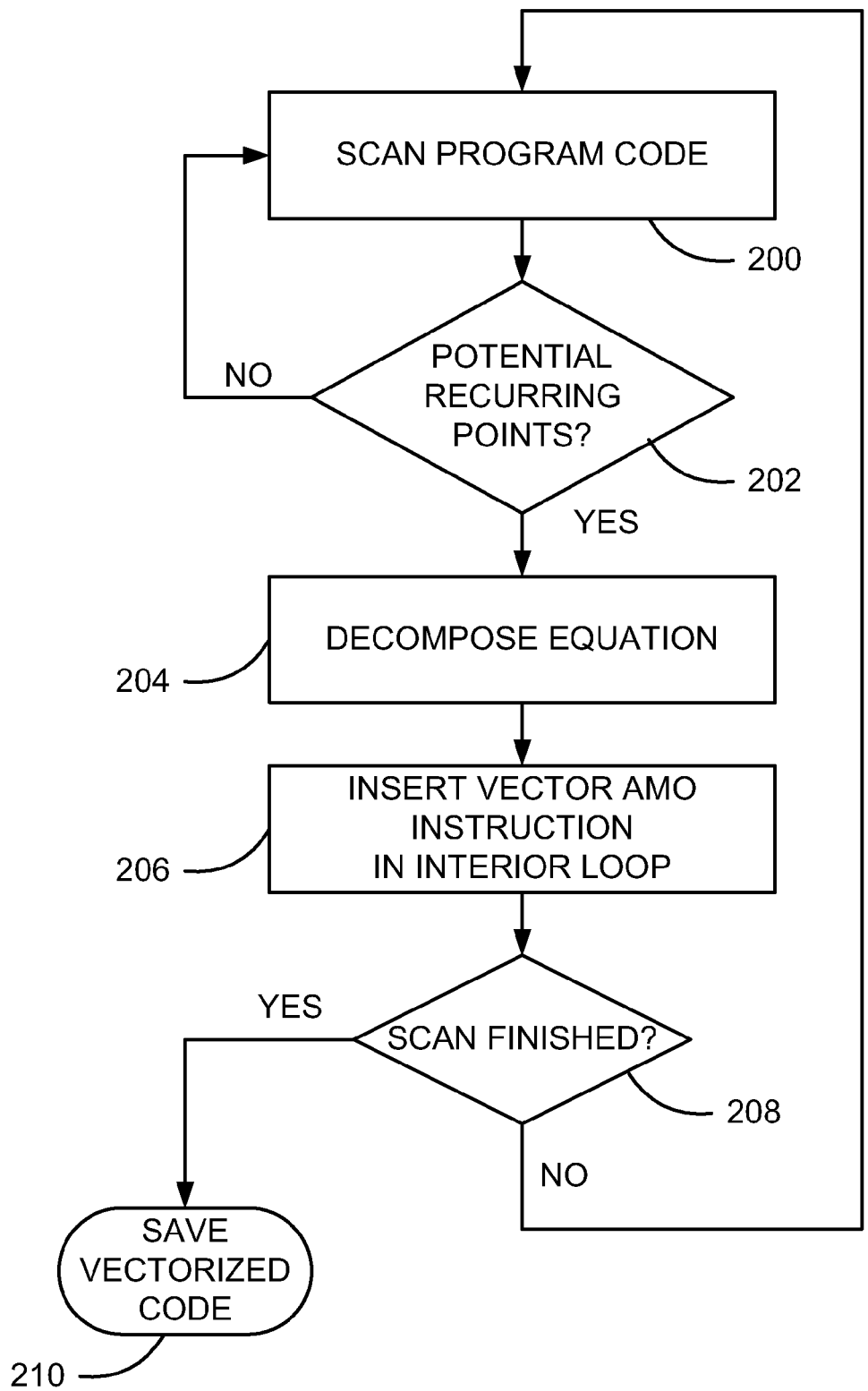
FIG. 3 shows a flowchart for performing a vector update in memory.

A method of compiling program code is shown in FIG. 3. In the method of FIG. 3, the program code includes an operation on an array of data elements stored in memory of a computer system. The program code is scanned at 200 for an equation which may have recurring data points. On detecting a potential recurring data point at 202, control moves to 204, where the equation is replaced with vectorized machine executable code by decomposing the equation at 204 and inserting a vector AMO instruction where appropriate at 206. A check is made at 208 to see if the scan is finished. If not, control moves to 200 Otherwise, control moves to 210 and the vectorized code is saved.

In one such embodiment, each equation is decomposed into a nested loop, wherein the nested loop comprises an exterior loop and a virtual interior loop. The exterior loop decomposes the equation into a plurality of loops of length N, wherein N is an integer greater than one. The virtual interior loop executes vector operations corresponding to the N length loop to form a result vector of length N, wherein the virtual interior loop includes a vector atomic memory operation (AMO) instruction.

In one embodiment, N is set to equal the vector length of the vector register in the computer system.

The method simplifies the process of performing a vector update by eliminating the need to repair recurring data points in software.

The method further improves the performance by avoiding the use of vector registers for the memory update altogether, moving the functionality onto the hardware memory system. This avoids the time normally taken moving data to and from the central processor, by performing the update operation directly in the memory controller.

Finally, the method works for multiprocessor parallelism in addition to local vectorization, as the hardware memory system takes care of conflicts between processors as well as conflicts within a vector on a single processor.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the subject matter described herein. It is intended that this subject matter be limited only by the claims, and the full scope of equivalents thereof.

Such embodiments of the subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

The Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

The invention claimed is:

1. A computer implemented method of compiling program code, wherein the program code includes an operation on an array of data elements stored in memory of a computer system, the method comprising:
   a) scanning the program code for an equation which may have recurring data points;
   b) replacing the equation with vectorized machine executable code, wherein the machine executable code comprises a nested loop and wherein the nested loop comprises:
      an exterior loop which decomposes the equation into a plurality of loops of length N, wherein N is an integer greater than one;
      a virtual interior loop for executing vector operations corresponding to the N length loop to form a result vector resident in memory, wherein the virtual interior loop includes a vector atomic memory operation (AMO) instruction.

2. The method of claim 1, wherein the computer system is a vector processing computer with vector registers of length VL and wherein VL is equal to N.

3. The method of claim 1, wherein the vector atomic memory operation is performed in a memory controller.

4. A computer implemented method of compiling program code, wherein the program code includes a mathematical operation on an array of data elements stored in memory of a computer system, the method comprising:
   a) scanning the program code for an equation which may have recurring data points;
   b) replacing the equation with vectorized machine executable code, wherein the vectorized machine executable code comprises vectorization code for performing the mathematical operation as a vector atomic memory operation, wherein the vector atomic memory operation uses memory hardware to compensate for recurring data points.

5. The method of claim 4, wherein the vector atomic memory operation is performed in a memory controller.

6. A computer implemented method of compiling program code, the method comprising:
   scanning the program code for an equation that specifies to perform an operation on a vector of data elements;
   determining whether the equation may have recurring data points;
   upon determining that the equation may have recurring data points, replacing the equation with an vector atomic memory operation (AMO) instruction that performs the operation on the vector of data elements; and
   upon determining that the equation does not have recurring data points, replacing the equation with a vector instruction that performs the operation on the vector of data elements.

7. The method of claim 6 wherein the replacing of the equation with the vector AMO instruction includes inserting a loop that executes a vector AMO instruction at each iteration of the loop on a number of data elements based on a length of a vector register for vector AMO instruction.

8. The method of claim 7 wherein the equation is decomposed into a virtual interior loop with a number of iterations based on the length of the vector register.

9. The method of claim 6 wherein the equation may have recurring data points when an index for the vector has repeated values.

* * * * *